Apr. 17, 1923. 1,452,136
A. ANCIDONI
TIRE CONSTRUCTION
Filed April 18, 1922
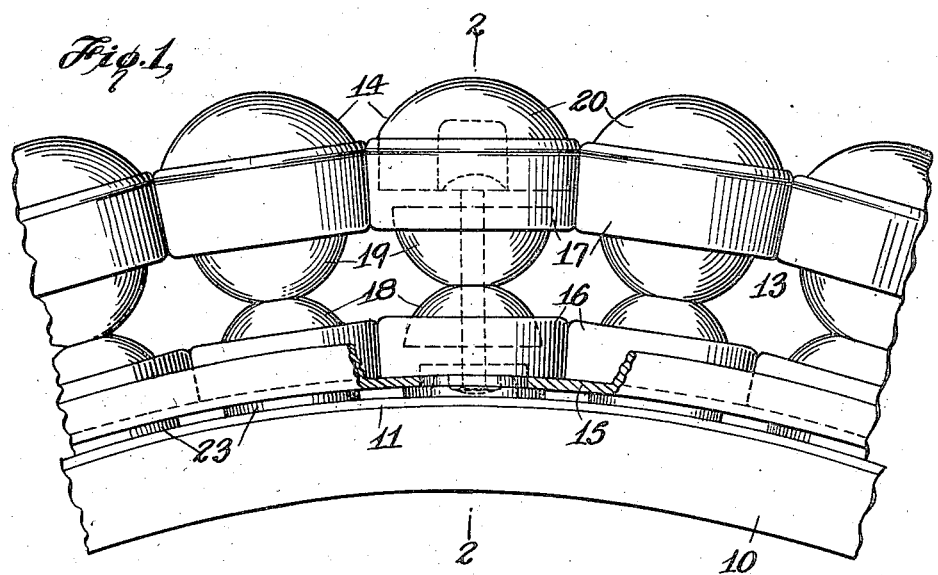
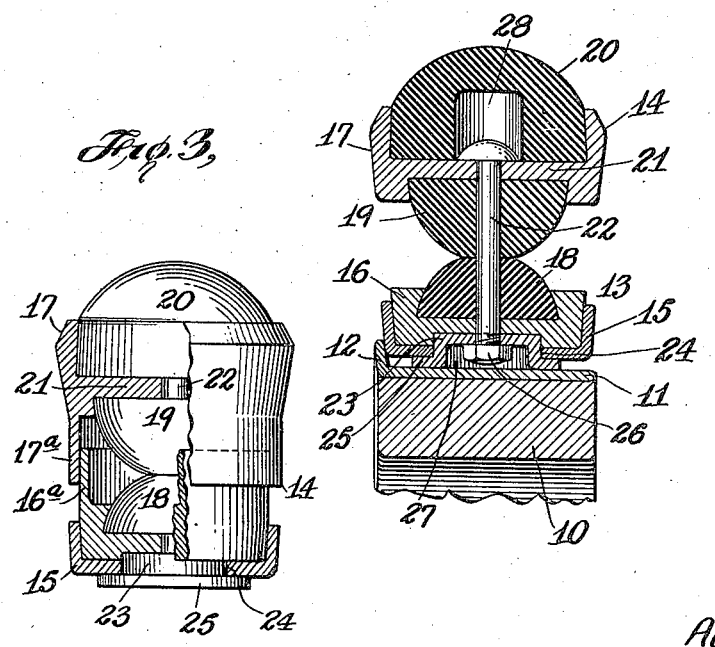
Inventor
Alfred Ancidoni
By his Attorneys
Edgar Date & Co Patented Apr. 17, 1923.

1,452,136

UNITED STATES PATENT OFFICE.

ALFRED ANCIDONI, OF NEWARK, NEW JERSEY.

TIRE CONSTRUCTION.

Application filed April 18, 1922. Serial No. 555,287.

*To all whom it may concern:*

Be it known that I, ALFRED ANCIDONI, a citizen of the United States, and residing at Newark, in the county of Essex and State of New Jersey, have invented certain new and useful Improvements in Tire Constructions, of which the following is a specification, such as will enable those skilled in the art to which it appertains to make and use the same.

This invention relates to tires and particularly to devices of this class adapted for use in connection with motor vehicles, and the object of the invention is to provide a resilient tire composed of a plurality of resilient units mounted in juxtaposition in a circumferential path to form an annular resilient tire member, the separate units being independent of each other and being adapted to be detachably mounted in connection with a suitable support; a further object being to provide a support for said resilient units which will constitute a demountable rim for the wheel of a vehicle and in connection with which said units are mounted and capable of independent attachment and detachment therewith; and with these and other objects in view the invention consists in a tire of the class and for the purpose specified which is simple in construction and operation, strong and durable in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a side view of a part of the felly of a wheel showing a predetermined portion of my improved tire construction, part of the construction being broken away and in section;

Fig. 2 a section on the line 2—2 of Fig. 1; and,

Fig. 3 a partial sectional view similar to Fig. 2 and showing a modification.

In the drawing, I have indicated at 10 a felly of a motor vehicle wheel, said felly being provided with a metal facing plate or ring 11 having a flange 12 at one side thereof preferably the inner side and, in practice, my improved tire construction 13 is adapted to be detachably mounted in connection with said felly and held in position thereon in the usual manner or any desired manner.

My improved tire construction comprises a plurality of resilient units 14 adapted to be mounted in connection with a demountable rim 15 which is approximately U-shaped in form in cross section as shown in Fig. 2 of the drawing.

The resilient units 14 are each composed of a base plate or disk 16 and a member 17 spaced from the disk 16 by semi-spherical resilient members 18 and 19, the member 18 being mounted in the disk 16, while the member 19 is mounted on the inner face of the member 17. Mounted in the outer face of the member 17 is a resilient tread member 20 which is also approximately hemispherical in form, and the members 19 and 20 are separated by a transverse wall 21 in the member 17 and a bolt, rivet or the like 22 is passed through the wall 21, the resilient members 18 and 19 and through said disk, as clearly shown in Fig. 2, and a cup-shaped member 23 is mounted in an aperture 24 in the rim 15 and the flange 25 thereof serves to space said rim from the plate 11 of the felly 10, as clearly shown in said figure, and the nut 26 of the bolt 22 or the head of the rivet, if said device be a rivet, is located within the recess 27 of the cup-shaped member 23.

It will be apparent that the bolt or rivet 22 serves to hold the separate parts 16, 17, 18, 19 and 23 together and in position upon the demountable rim 15, as clearly shown in Fig. 2, and the resilient tread member 20 is preferably provided with a central pocket or chamber 28 to permit of the passage of the head of the bolt or rivet 22 outwardly through said pocket or chamber in the operation of the tire or the separate units 14 thereof. It will be understood that as the separate units 14 pass over the ground or road-way the resilient members 18 and 19 will be compressed to a predetermined degree and the member 17 will move inwardly upon the bolt or rivet 22 in this operation.

It will be understood that each of the units 14 employed will be constructed in the manner above set out, and these units when assembled and mounted upon the rim 15 will constitute a part of such rim and may be mounted in connection with a wheel, or the felly thereof, by simply passing the same inwardly over the plate 11 of said felly and will be held against displacement by the flange 12 of said plate and by the usual lock plates or devices commonly employed in retaining demountable rims in connection with wheels.

As shown in the drawing the members 17 of the separate units 14 are circular in form and are so assembled as to come in comparatively close relation one with another to form a substantially annular tire member composed of the separate units, but it will be understood that I am not necessarily limited to the specific mounting of the units, as herein shown and described, nor to the specific construction thereof herein set out.

In Fig. 3 of the drawing, I have shown a slight modification of the separate units in which the member 17 is provided with an inwardly directed sleeve extension 17$^a$, and the disk 16 is provided with an outwardly directed sleeve extension 16$^a$ adapted to fit within the sleeve extension 17$^a$, and these sleeve extensions serve to form an enclosure for the resilient members 18 and 19, and while I have shown certain details of construction for carrying my invention into effect, it will be understood that I am not necessarily limited to these details, and various changes therein and modifications thereof may be made, within the scope of the appended claims, without departing from the spirit of my invention or sacrificing its advantages.

Having fully described my invention, what I claim as new and desire to secure by Letters Patent, is:—

1. A tire of the class described composed of a plurality of resilient units mounted in a circumferential path, said units each being composed of a plurality of substantially hemispherical resilient members, and means for coupling said members together.

2. A tire of the class described composed of a plurality of resilient units mounted in a circumferential path, said units each being composed of a plurality of substantially hemispherical resilient members, means for coupling said members together, and a suitable mounting for said units.

3. A tire of the class described composed of a plurality of resilient units mounted in a circumferential path, said units each being composed of a plurality of substantially hemispherical resilient members, means for coupling said members together, and a suitable mounting for said units, said mounting constituting a rim for the tire and being adapted to be mounted upon the felly of a wheel.

4. A tire of the class described composed of a plurality of resilient units mounted in a circumferential path, said units each being composed of a plurality of substantially hemispherical resilient members, means for coupling said members together, a suitable mounting for said units, said mounting constituting a rim for the tire and being adapted to be mounted upon the felly of a wheel, and means for supporting one of said resilient members of each unit in connection with said rim.

5. A tire of the class described composed of a plurality of resilient units mounted in a circumferential path, said units each being composed of a plurality of resilient members, means for coupling said members together, a suitable mounting for said units, said mounting constituting a rim for the tire and being adapted to be mounted upon the felly of a wheel, and means for supporting one of said resilient members of each unit in connection with said rim, another of said resilient members of each unit constituting a tread member.

6. A tire of the class described composed of a plurality of resilient units mounted in a circumferential path, said units each being composed of a plurality of resilient members, means for coupling said members together, a suitable mounting for said units, said mounting constituting a rim for the tire and being adapted to be mounted upon the felly of a wheel, means for supporting one of said resilient members of each unit in connection with said rim, another of said resilient members of each unit constituting a tread member, and another resilient member in each unit intermediate of said first named members.

7. A resilient unit of the class described comprising a suitable base or mounting, a hemispherical resilient member mounted in connection with said base, another hemispherical resilient member mounted upon said first named member, a resilient tread member, and means for mounting said last named member in connection with the second named resilient member.

8. A resilient unit of the class described comprising a suitable base or mounting, a hemispherical resilient member mounted in connection with said base, another hemispherical resilient member mounted upon said first named member, a resilient tread member, means for mounting said last named member in connection with the second named resilient member, and means for holding the separate parts of said unit together and in connection with said base or mounting.

9. A resilient tire unit of the class described comprising a suitable base, a member, means for connecting said member with said base, two hemispherical resilient members mounted on said last named means and between said base and said member, and a resilient tread member mounted in connection with said member.

10. A resilient tire unit of the class described comprising a suitable base, a member, means for coupling said member with said base, two hemispherical resilient members mounted on said coupling means and between said base and said member, and a resilient tread member mounted in connection with said member, said tread member being provided with a pocket into which said coupling means is adapted to pass.

11. A resilient tire unit of the class described comprising a suitable base, a member, means for coupling said member with said base, two hemispherical resilient members mounted on said coupling means and between said base and said member, a resilient tread member mounted in connection with said member, said tread member being provided with a pocket into which said coupling means is adapted to pass, and means for mounting said unit in connection with an annular rim.

12. A resilient tire unit of the class described comprising a suitable base, a member, means for coupling said member with said base, two hemispherical resilient members mounted on said coupling means and between said base and said member, a resilient tread member mounted in connection with said member, said tread member being provided with a pocket into which said coupling means is adapted to pass, means for mounting said unit in connection with an annular rim, and said base and member being provided with telescoping parts enclosing said hemispherical resilient members.

13. A resilient tire unit of the class described comprising a suitable base, a member, means for connecting said member with said base, two resilient members mounted on said last named means between said base and said member, and a resilient tread member mounted in connection with said member.

14. A resilient tire unit of the class described comprising a suitable base, a member, means for connecting said member with said base, two resilient members mounted on said last named means between said base and said member, and a resilient tread member mounted in connection with said member, said tread member being provided with a pocket into which said coupling means is adapted to pass.

15. A resilient tire unit of the class described comprising a suitable base, a member, means for connecting said member with said base, two resilient members mounted on said last named means between said base and said member, a resilient tread member mounted in connection with said member, and means for mounting said unit in connection with an annular rim.

In testimony that I claim the foregoing as my invention I have signed my name this 15th day of April 1922.

ALFRED ANCIDONI.